No. 846,763. PATENTED MAR. 12, 1907.
A. J. THOMPSON.
EGG BEATER.
APPLICATION FILED JUNE 15, 1906.
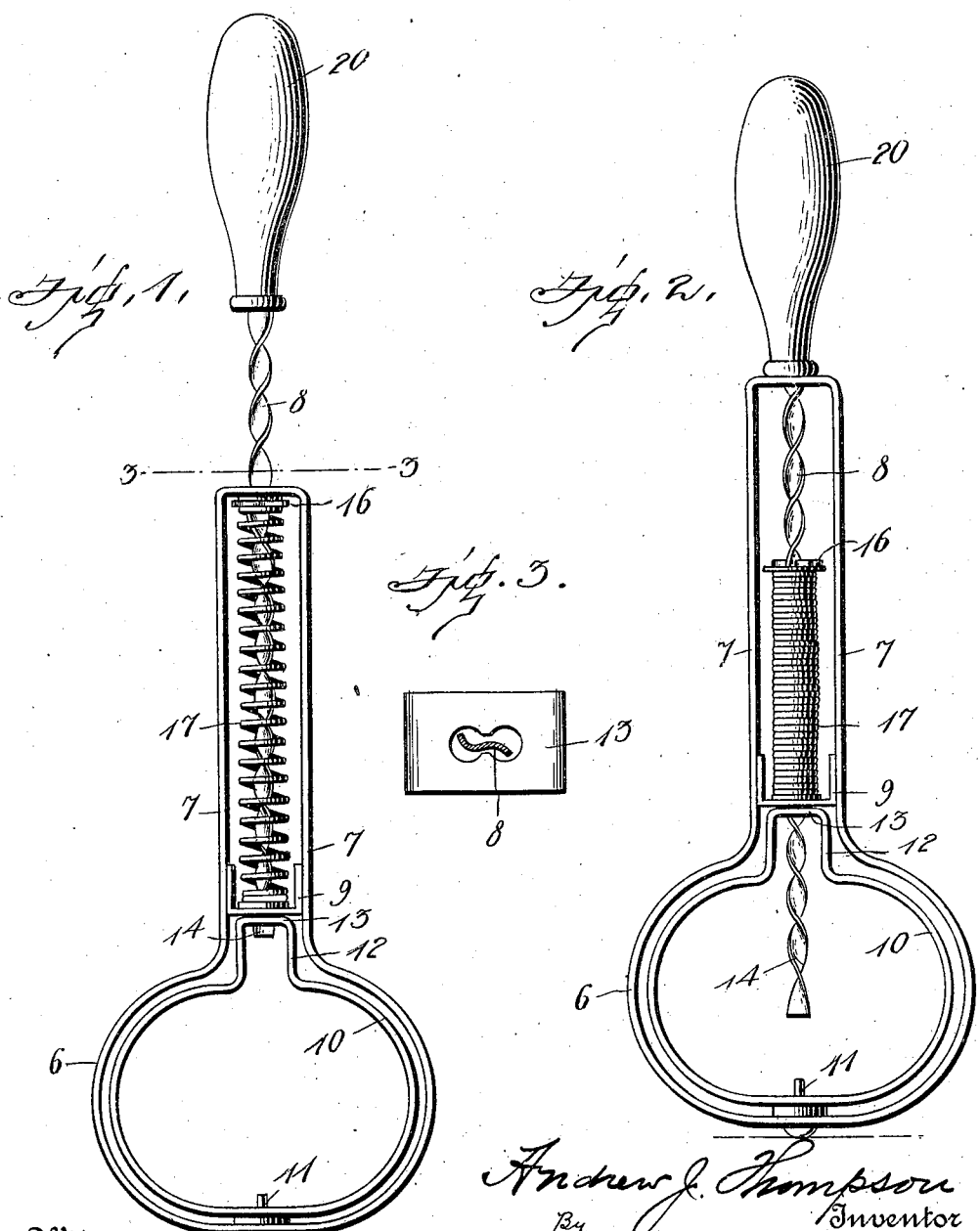
Witnesses
Andrew J. Thompson
Inventor
By
Attorneys

UNITED STATES PATENT OFFICE.

ANDREW J. THOMPSON, OF CHICAGO, ILLINOIS.

EGG-BEATER.

No. 846,763.   Specification of Letters Patent.   Patented March 12, 1907.

Application filed June 15, 1906. Serial No. 321,872.

*To all whom it may concern:*

Be it known that I, ANDREW J. THOMPSON, a citizen of the United States, residing at Chicago, in the county of Cook and State of Illinois, have invented new and useful Improvements in Egg-Beaters, of which the following is a specification.

This invention is an egg-beater, and it is characterized particularly by a construction having two beater-loops, one of which is made to rotate in one direction and the other in the opposite direction. This produces a very efficient and rapid action. The construction is also such that the beater can be operated with one hand, which is advantageous, because it leaves the other hand free to hold the bowl or vessel containing the eggs or other matter to be beaten or stirred.

In the accompanying drawings, Figure 1 is a plan view of the device with the handle up. Fig. 2 is a similar view with the handle pushed down. Fig. 3 is a section on the line 3 3 of Fig. 1.

Referring specifically to the drawings, 6 indicates an outer loop or beater-blade having an upwardly-projecting extension forming spaced side bars 7, connected across at the top, and said cross-piece has an opening or slot through which the upper part 8 of a spiral rod extends. The opening is of proper shape to run on the spiral, so that a rotary motion of the loop is produced. The bars 7 are braced near the lower ends by a cross-piece 9, through a round hole in which the lower end of the spiral rod works.

At 10 is indicated an inner loop or beater-blade, and this is mounted to rotate upon a pivot-pin 11, set in the outer loop, at the bottom thereof. The inner loop has at the top extensions 12, connected by a cross-piece 13, which has an opening through which the lower portion 14 of the spiral rod works, the opening being shaped to run on the spiral, and consequently to rotate the inner loop.

The rod referred to has right and left spirals, the upper part of the rod, which operates the outer loop, being of one hand and the lower portion of the rod, which operates the inner loop, being of the other hand. The twist changes or reverses at a stop 16, consisting of a cross-pin which strikes the cross-piece at the top of the uprights 7, and so limits the upward movement of the rod. This upward movement is produced by a spring 17, coiled around the lower part of the spiral rod and confined between the pin 16 and the lower cross-piece 9. A handle 20 is secured to the top of the spiral rod.

In operation pressure downward on the handle causes the respective loops to run on the right and left portions of the spirals, respectively, and so said loops are rotated in opposite directions. When the pressure is released, the spring lifts the handle and spiral and produces the reverse motion of both loops. Hence there is an opposite motion of both loops both on the downstroke and on the reverse. This gives a compound action which is very effective and rapid for the purpose intended.

I claim—

1. In a beater of the kind stated, the combination of outer and inner rotary loops, and a rod having right and left spirals working respectively through openings in the respective loops, shaped to engage the spirals to produce rotation of the loops by reciprocation of the rod.

2. In a beater of the kind stated, the combination of inner and outer rotary loops having a common axis, the outer loop having an upwardly-projecting extension, and a rod having upper and lower right and left spirals movable respectively through openings in the extension and the inner loop, said openings being shaped to engage the spirals and produce rotation of the loops by reciprocation of the rod.

3. In a beater of the kind stated, the combination of an outer rotary loop having upwardly-projecting side pieces and upper and lower cross-pieces connecting the same, an inner rotary loop having the same axis as the outer loop, a rod having an upper spiral in one direction extending through an opening in the upper cross-piece and a lower spiral in the opposite direction extending through an opening in the lower loop, said openings being shaped to engage the spirals and rotate the loops, and a spring coiled around the rod between said upper and lower cross-pieces.

In testimony whereof I have signed my name to this specification in the presence of two subscribing witnesses.

ANDREW J. THOMPSON.

Witnesses:
SIGNA FELTSKOG,
H. G. BATCHELOR.